Figure 1A:
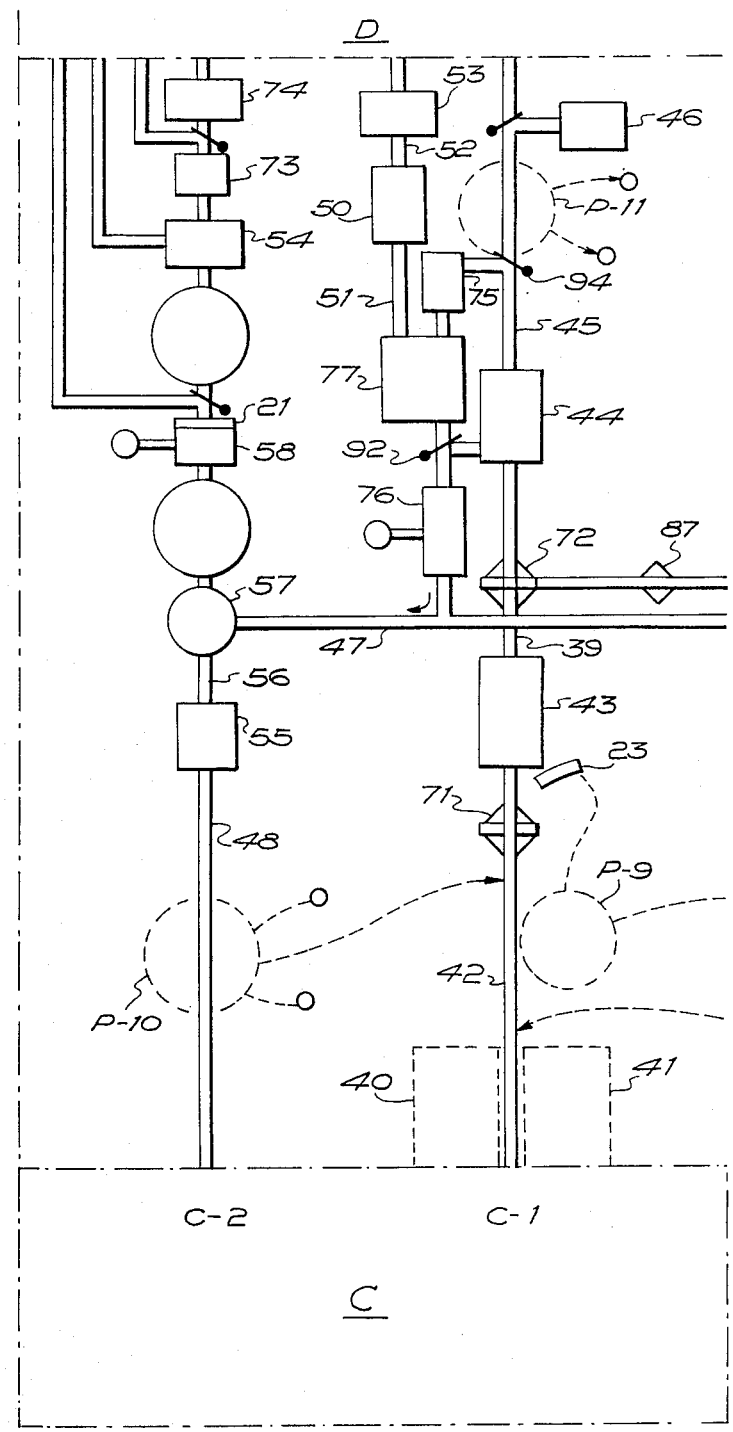

United States Patent [19]

Moore

[11] Patent Number: 4,859,211

[45] Date of Patent: Aug. 22, 1989

[54] WASTE RECLAMATION SYSTEM FOR PELLETIZING FUEL PELLETS

[75] Inventor: Richard S. Moore, North Yorkshire, England

[73] Assignee: Materials Recycling Management Ltd., Harrogate, United Kingdom

[21] Appl. No.: 86,540

[22] Filed: Aug. 18, 1987

[30] Foreign Application Priority Data

Feb. 17, 1987 [GB] United Kingdom ............... 8703589

[51] Int. Cl.$^4$ ........................... C10L 5/40; C10L 5/46
[52] U.S. Cl. ........................................ 44/589; 44/605; 44/629
[58] Field of Search ....................................... 44/11–13, 44/589, 605, 629, 593, 596

[56] References Cited

U.S. PATENT DOCUMENTS

| | | | |
|---|---|---|---|
| 3,506,414 | 4/1970 | Skendrovic | 44/589 |
| 3,790,091 | 2/1974 | Law et al. | 44/541 |
| 3,910,775 | 10/1975 | Jackman | 44/589 |
| 4,026,678 | 5/1977 | Livingston | 44/589 |
| 4,049,391 | 9/1977 | Marsh | 44/589 |
| 4,203,376 | 5/1980 | Hood | 44/605 |
| 4,420,320 | 12/1983 | Hartmann et al. | 44/605 |
| 4,561,860 | 12/1985 | Gulley et al. | 44/589 |

Primary Examiner—Carl F. Dees
Attorney, Agent, or Firm—Fred Philpitt

[57] ABSTRACT

A system is proposed for the treatment of essentially all the wastes arising in a community, and for recovering useable products therefrom, based on a combination of pre-sorting and mechanical and manual separation. Clean dry secondary organic wastes such as paper and textiles are separately baled for re-use, contaminated secondary organic wastes are prepared for re-use as fuel; primary organic waste such as wood and other vegetable matter is prepared, as appropriate, as fuel, as compost or for re-use as wood chips. Mixed wastes are separated by size and by density according to the ease of separation and the increased re-use potential of the separated as opposed to the mixed materials.

9 Claims, 4 Drawing Sheets

WASTE RECLAMATION SYSTEM FOR PELLETIZING FUEL PELLETS

The invention relates to an integrated system for the collection and disposal of domestic and industrial wastes, wherein disposal is to be understood as including not only dumping at land-fill sites but also, when practicable and economic, re-use.

Most current waste-disposal schemes are ad-hoc and relate to the wastes of particular industries and communities, whilst the recycling or recovery of useful materials from waste tends to operate selectively. It has now been realized that to maximise the recycling potential of wastes, consideration has to be given to the collection and appropriate treatment of all waste generated in a locality.

Whilst some types of waste capable of being reused, such as kitchen waste reusable as animal feed, and other types of waste having no known reuse potential, such as demolition rubble, need to be collected and treated completely separately from other wastes, it has now been realized that many categories of waste may, either in collection or otherwise, be more or less intimately combined with othher materials whilst more or less retaining their reuse value, depending on the possibility of economic separation of "pure" waste and the availability of markets for contaminated wastes.

According to one aspect of the invention, therefore, there is provided a method for the reclamation of wastes comprising assembling at a waste reclamation centre a plurality of categories of waste each capable of conversion into a marketable product, converting waste of each category into the marketable product in a conversion line, and transferring contaminated waste of one category to the conversion line for the or an other category.

Preferably, the marketable product of the waste of the said one category is of a greater value than that of the said other category.

The categories of greater reuse value may include clean and dry organic wastes such as paper, cardboard, textiles, plastics, rubber, and wood, as well as inorganic wastes such as metals and glass, whilst categories of lesser reuse value may include organic wastes either wet or contaminated, or both wet and contaminated, and contaminated inorganic wastes. Organic wastes may be contaminated by inorganic or other organic matter, and inorganic wastes may be contaminated by organic or other inorganic matter.

According to a further aspect of the invention there is provided a method for the reclamation of wastes comprising assembling at a waste reclamation centre dry secondary organic wastes separated into generally uncontaminated waste, waste contaminated with lesser amounts of extraneous matter and waste contaminated with greater amounts of extraneous matter, transferring uncontaminated waste in a first processing line to a packing zone within the centre and packing same for primary reuse, transferring the lesser contaminated waste in a second processing line to a pelletising zone within the centre and pelletising same for reuse as a fuel, and in a third processing line separating from the waste contaminated with greater amounts of extraneous matter components suitable for primary reuse and for reuse as fuel and transferring said components respectively to the first and second processing lines.

The extraneous matter may be inorganic.

Preferably, contaminated waste found in the first processing line is transferred to the second processing line and relatively uncontaminated waste found in the second processing line is transferred to the first processing line.

From material remaining in the third processing line after the transfer of components to the first and second lines, inorganic components may be separated for appropriate reuse. Organic matter separated with the said inorganic matter may subsequently be removed therefrom. The inorganic matter may be further separated into glass, and metals, and the metals may be separated into ferrous and non-ferrous.

According to yet a further aspect of the invention there is provided apparatus at a waste reclamation centre comprising packing means for dry secondary organic waste, conveyor means for transferring dry secondary organic waste from a first collection zone to the packing means and from the packing means to a first dispatch zone, means for pelletising dry secondary organic into fuel pellets, conveyor means for transferring lesser-contaminated waste from a second collection zone to the pelletising means and from the pelletising zone to a second dispatch zone, means for separating components of greater-contaminated waste, conveyor means for transferring greater-contaminated wastes from a third collection zone to the separating means, and separate conveyor means for transferring separated components of the greater-contamined wastes to the said packing means and to the said pelletizing means.

The secondary organic waste may include one or more of paper, plastics, textiles, and rubber, and the inorganic contaminants may include one or more of glass, non-ferrous metal and ferrous metal.

The separating means may include means for separating components by size, by density, by strength, and by magnetic flux.

The apparatus may also include means for conveying components separated by size and by density to a composting zone.

According to a fourth aspect of the invention there is provided a method for the reclamation of wastes at a waste reclamation centre comprising transferring organic waste from a first collection zone to a chipping means, chipping the said waste and transferring the chipped waste from the chipping means to a first dispatch zone in a first processing line, transferring primary organic waste from the first processing line to compressing means, compressing the said primary waste into fuel briquettes and transferring the briquettes to a second dispatch zone in a second processing line, and transferring other organic wastes from a second collection zone to a compost zone and converting said other wastes into compost.

Material from the first or second processing line may be transferred to the said compost zone.

According to a fifth aspect of the invention there is provided apparatus at a waste reclamation centre comprising chipping means for primary organic waste, conveyor means for transferring the organic waste from a first collection zone to the chipping means and from the chipping means to a first dispatch zone, means for compressing organic waste into fuel briquettes, further conveyor means for transferring primary organic waste from the first said conveyor means to the compressing means and from the compressing means to a second dispatch zone, and yet other conveyor means for transferring other wastes from a second collection zone to a compost zone.

The apparatus may include means for transferring waste from the further conveying means to the compost zone.

The primary organic waste may include one or both of dry and green timber and the other waste may include one or both of wet paper and garden rubbish.

The apparatus may also include means for transferring waste from a machine within the centre for separating waste by size or by density to the said compost zone.

Figure 1B:
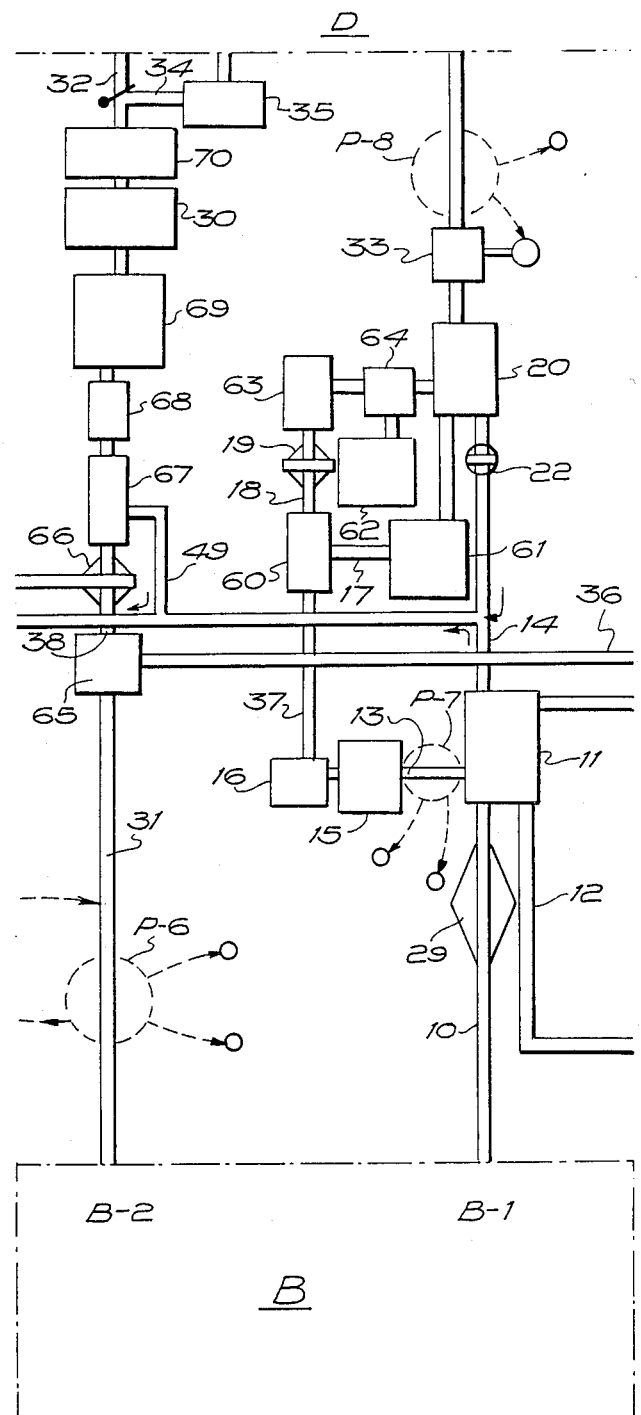
Figure 1C:
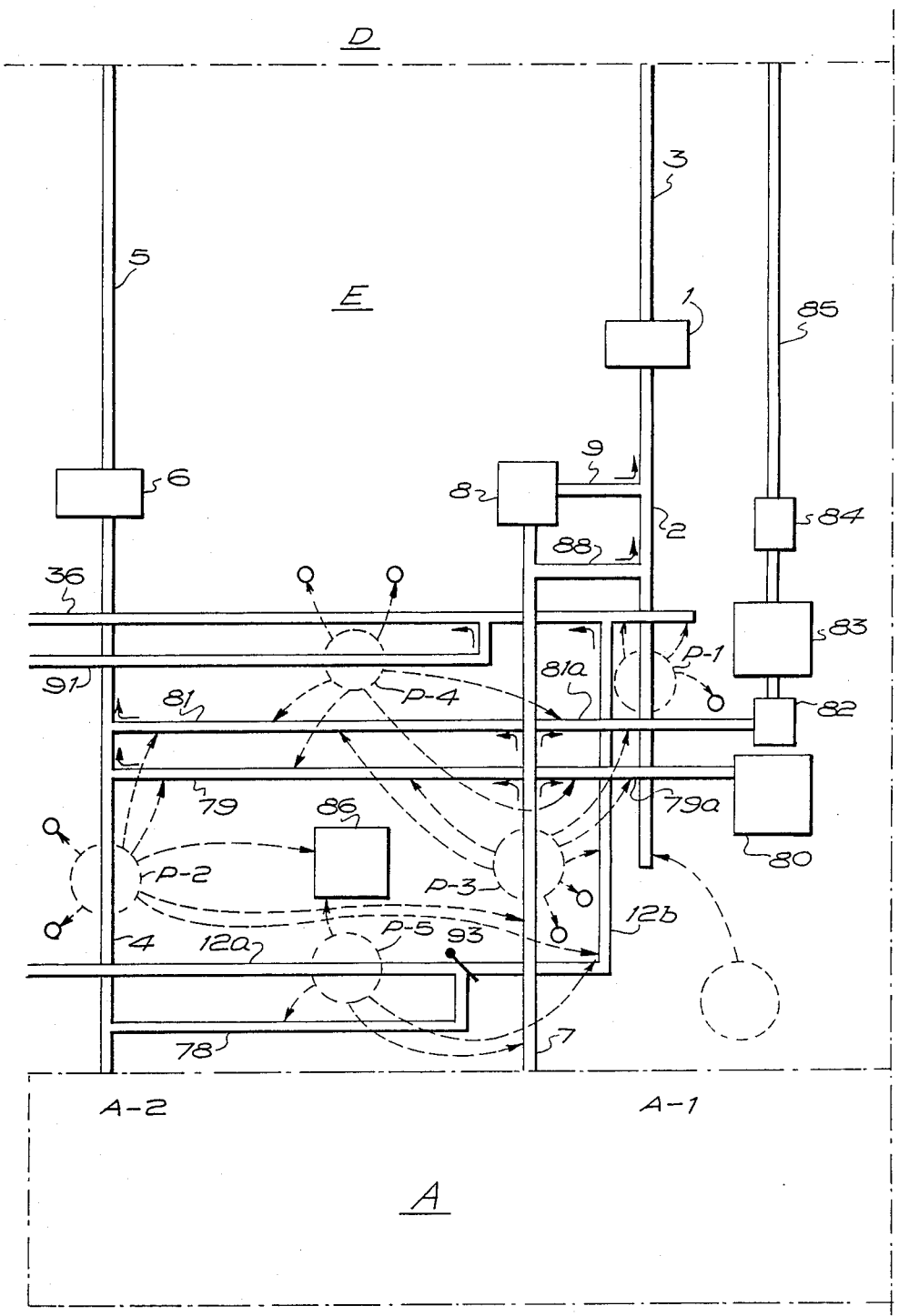
Figure 2:
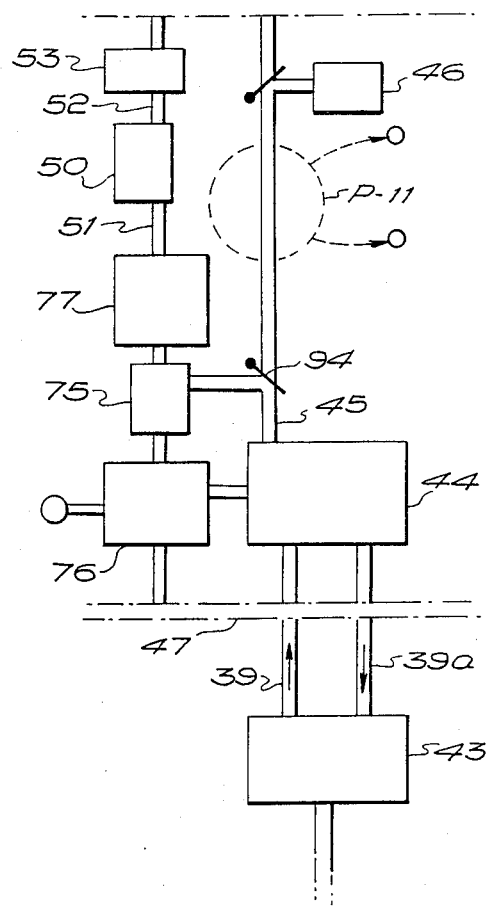

Embodiments of the invention will now be described with reference to the accompanying drawings of which:

FIG. 1 is a schematic representation of an integrated waste processing centre, and FIG. 2 represents a modification of part thereof.

The waste processing centre of the invention is a covered rectangular area defining three main waste-reception areas A, B and C, a storage and despatch area D and a processing area E. The areas A–D are easily accessible by lorries.

The reception areas correspond to the categories of waste which have been defined as being most capable of being collected from waste-generating premises separately and of producing the greatest income from the sale of reusable products. Among those categories are secondary organic wastes such as paper, board, textiles, plastics and rubber, which are capable, at best, of recycling and at worst of producing a fuel, and primary organic wastes such as timber and vegetable matter which are capable at best of being converted into chips for paper or board manufacture or, with possibly less valuable return, depending on market demand and processing costs, of being converted into fuel briquettes or compost.

Each of the reception areas is large enough to accommodate at least two separate piles of waste pending their treatment in the processing area E. The plan, is that lorries bringing predominantly clean, dry textiles, plastics, or rubber will deposit these materials in sub-area A-1 of area A, and similarly predominantly clean dry paper and cardboard will be deposited in sub-area A-2, whilst mixed and some contaminated dry paper, cardboard, textiles, plastics and rubbers are deposited at A-3.

Sub-areas B-1 and B-2 are for the reception of dry secondary organic wastes respectively more or less contaminated with matter such as wood, glass or metals. Typically, the wastes deposited in area B comprise office waste which is predominantly of paper but also includes such contaminants as carbon paper, plastics in the form of drinking cups, glass in the form of bottles and metals in the form of cans and paper clips. Experience of the various sources will normally decide the level of contamination and determine whether the waste is deposited at B-1 or B-2.

Area C-1 is for the reception of primary organic wastes such as green or dry timber, whilst C-2 is for wet organic waste such as wet paper and garden rubbish.

It is anticipated that area D will be solely for the storage and despatch of waste materials in a form acceptable to the trade which will reuse the material. Commonly, the materials will be contained in bales, bags or sacks but in some circumstances will be loose, and for the convenient containment of loose materials, the area D may house a number of storage bins or containers of the type used in containerised transportation.

MACHINERY

In the processing area E between the reception areas A-1 and the despatch area D there is a baling machine 1 of conventional construction. An endless conveyor belt 2 operates to carry material at the floor level from near area A-1 and feed it into the machine 1, whilst a further conveyor 3 carries baled material from machine 1 to the storage area D. According to requirements the conveyor 3 can terminate at floor or an elevated level.

The conveyors 2 and 3 define one of a plurality of generally parallel processing lines for waste material running between the reception and dispatch areas; other such processing lines will be described hereafter. Whilst some of the conveyors are continuously or intermittently driven endless belts, other and particularly shorter conveyors may be gravity chutes. At a few places, conveyors are seen to have lateral branches, and at these places switch means of conventional type are provided to control whether or not material travelling along the conveyors shall be diverted onto the branches. Again, whilst the main processing lines run parallel to conveyors 2 and 3, certain important conveyors run transversely, crossing or being crossed by certain of the processing lines.

Conveyors 4 and 5 define a further processing line, being arranged respectively to convey paper and cardboard waste from area A-2 to a baler 6 and baled paper and cardboard from the baler to the storage area. A further conveyor 7 rises from floor level in area A and runs parallel to and vertically above conveyor 2 (though for the sake of clarity shown in the drawings laterally thereof). The conveyor is capable of being adjusted so that in its most extended form it terminates at a coarse shredding machine 8, whilst in other forms it terminates between shredder 8 and conveyor 36, to be described later, as well as over conveyors 36, 79 or 81. The shredder 8 discharges directly onto conveyor 2 (the discharge means being shown schematically as "chute" 9). When slightly shortened the conveyor 7 discharges directly onto conveyor 2 (indicated schematically by chute 88) or conveyors 36, 79 or 81.

Between conveyors 4 and 7 is a silo 86 for the temporary storage of high-grade papers pending baling, and to one side of conveyor 2 is a similar silo 80 for polythene film. A shredding machine 82 for expanded polystyrene is also located adjacent conveyor 2, and its output is arranged close to a silo 83. A machine 84 for the production of polystyrene briquettes is located near the silo 83, and a conveyor 85 is arranged for conveying such briquettes to the storage area D.

A conveyor belt 10 operates to raise material from the level of the floor of area B-1 and convey it via a bag splitting machine 29 to an elevated grading or screening device 11 of conventional form. The grading device has four output ports, which respectively discharge the bulkiest materials onto a conveyor 91, less bulky material onto conveyor 12, which has extensions 12a and 12b, relatively small items onto conveyor 13 and dust onto a conveyor 14. (Conveyor 12b is shown, for the sake of clarity, laterally intermediate conveyors 2 and 7, but in practice is arranged vertically intermediate those conveyors).

The bulkiest items are likely, given the source of the material received at area B-1, to be wood, cardboard or plastics, and the conveyors 91 and 12a run towards conveyor 2 past picking stations P-4 and P-5, respectively, which are conveniently situated for the manual transfer of material to conveyors leading to balers 1 and 6 as well as to other treatment stations to be described below. A conveyor 78 runs from the conveyor 12a to conveyor 4.

Conveyor 13 carries much less bulky items, which include bottles, cans and scraps of paper and plastics, to an air separator or ballistic separator 15 of conventional type which is capable of removing light-weight items such as scraps of paper and plastics cups (to which further reference will be made below), leaving the denser items to be fed into a crusher 16. The crusher is capable of breaking any bottles and other glass into small fragments which pass through a fine mesh screen 60 onto a conveyor 17, and of crumpling cans which are deposited onto conveyor 18. The conveyor 18 runs beneath a magnetic separator 19 arranged to separate ferrous (tin-plate) cans from non-ferrous (aluminium) cans. The conveyor 17 leads to a glass silo 61 whilst silos 62 and 63 are positioned to receive, respectively, ferrous and non-ferrous cans. Adjacent the silos is a can flattening machine 44 of conventional type.

In spite of the various separation devices, and the vigilance of operatives, the glass fragments and the metal items may be contaminated by vegetable or other relatively light-weight matter including plastics containers. These contaminants may be removed by passing each of the classes of inorganic matter, in turn, through a screen or flotation bath 20 which carries away low-density contaminants, as will be explained below. A further device 22 is incorporated for the separation of plastics containers from the low-density contaminants; these will be deposited into a bin. Screen 33 and a picking station P-8 are provided for the removal of any contraries.

A conveyor 31 rises from floor level at the edge of area B-2 to carry material deposited there to the input of a first shredder 65. Following the shredder in the general line of the conveyor 31 are a magnetic separator 66, a screen 67, a second shredder 68 and a silo 69. In another embodiment not shown the screen 67 preceeds magnetic separator 66, which can be augmented or replaced by a ballistic separator. A pelletising machine 30, of a type known for forming particulate organic materials into fuel pellets, and a pellet cooler 70, are located adjacent silo 69, whilst a further conveyor, 32, is positioned to receive pellets discharged from the cooler and discharge them into bins in the storage area or onto a further conveyor 34 which transfers them to a bagging machine 35. The magnetic separator 66 is in the form of an overband magnet which discharges into a bin 87. A conveyor 49 carries fines from the screen 67 to the conveyor 47.

Wide platform conveyors 40 and 41 are arranged adjacent reception area C-1 and to the respective sides of a conveyor 42 towards which they slowly advance and which leads to a timber chipping machine 43 for shredding timber into wood chips. Upstream of the chipping machine are a metal detector 71 for warning of the approach of metal and a stationary saw-bench 23 for the removal of large metal items such as bolts. Downstream of of chipper is a magnetic separator 72 for removing metal particles from the shredded chips. The separator 72 is similar to separator 66 described above and is arranged to discharge into the same bin 87.

Downstream again from the separator is a screening machine 44 for the removal of fines and undersized chips. Conveyor 45 is arranged to transfer desirably sized chips either to a bagging machine 46 or directly to a container (not shown) in the despatch area, but a second switch 94 serves to divert chips, when necessary, from conveyor 45 into chipper 75.

Adjacent to the second chipper 75 are a screen or sink float 76 and a silo 77 for wood chips. The chipper 75 discharges into the silo and control means 92 are provided to determine whether fines and undersized chips discharged from screen 44 are fed to screen or float 76 or silo 77. A conveyor 51 is arrranged for transferring wood chips from the silo 77 into a briquette forming machine 50 whilst conveyor 52 is arrranged for transferring briquettes produced by the briquetter to a bagging machine 53. High-density material separated out by screen or sink-float 76 are dumped into a bin whilst low-density material is arranged to be transferred on to conveyor 47 to be described below.

Adjacent reception area C-2 is a comminuting machine 55 for reducing soft woody tissue and other vegetable matter such as garden rubbish into a readily biodegradable state and conveyor 56 is arranged to carry this reduced material to a compost zone 57. Screen 58 which includes an overband magnet 21 of the type previously described and screen 59, a grinding machine 73 and a bagging machine 74 are arranged between the compost zone and the despatch area.

Reference has already been made to conveyors which run generally transversely to the processing lines. Their functions will be described in detail below, but it is appropriate at this stage to indicate that each one crosses or links a plurality of processing lines. Thus, transverse conveyor 36 crosses under conveyor 7 (when extended), and over 14, 2 and 4 and terminates at the input of shredder 65. The conveyor 47, already referred to, crosses over conveyors 37, 38 and 39, and terminates in the vicinity of the zone 57. Conveyors 79 and 81 run from conveyor 7 to conveyor 4, whilst conveyors 79a and 81a run from conveyor 7 respectively to silo 80 and shredder 82.

An elevated control station (not shown) is constructed in such a position that control staff working there can survey the whole building, and operate, or instruct operatives working at the various picking stations to operate, the various switches and the stopping and starting of the various conveyors and treatment machines. They also control the deposition of waste material at A, B and C.

OPERATION

The operation of the machines already described will now be indicated. Whilst much of the processing is continuous and semi-automatic it is important to realize that the operator of the system does not have complete control either of the quantity or the quality of the input material or yet of the demand for (and thus the value of) the output material. Consequently the system has been designed to provide for alternative processing routes for the waste material in the events, for example, of machine failure and changes in the market, and manual displacement of materials and interruption of machines.

Throughout the following description, reference will be made to dry and wet material, and these terms are to be understood as indicating materials with respectively less than and more than 15% moisture content. Clean and, as defined above, dry waste textiles, rubbers and plastics films are assembled at A-1 and separately loaded by hand onto conveyor 2 which transfers them to baling machine 1 which compresses them into bales which are then transferred by conveyor 3 to the storage zone to await dispatch. When a sufficient quantity of top-class paper to form a bale is available, and assuming the conveyor is empty, the paper is placed on the conveyor and passed to the baler 1. Similarly, from time to time and when the conveyor 2 and baler 1 are empty, polythene film accumulated in silo 80 is removed onto conveyor 2 to be formed into a bale of polythene.

An operative is intended to be positioned at a picking station P-1, adjacent conveyor 2. If in spite of care in depositing only clean material at A-1, contaminated material is found on conveyor 2 it is the responsibility of that operative manually to divert that material either to conveyor 36, so that it is eventually taken to the pelleting machine 30, or, in the case of non-combustible contaminants, to a bin (not shown) of which the contents will from time to time be dumped.

Whilst the materials loaded onto conveyor 2 are largely clean and separate paper, textiles, plastics films and rubbers, conveyor 7 is loaded with mixed materials, assembled at A-3, including all the above and also expanded polystyrene and cardboard and some materials contaminated with organic matter. The conveyor, as already mentioned, can terminate at any of conveyors 79, 81 or 36 or "chute" 88, or can be extended to shredder 8. The extension of the conveyor is under control of the operative at picking station P-3, or his supervisor in the control station. If the material passing along the conveyor 7 is largely of clean high-grade paper the conveyor may be extended to shredder 8, and any extraneous material observed will be manually picked off and placed in bins for glass/metal or for compost, or onto appropriate cross-conveyors, namely 81a for polystyrene, 79a for polythene, 79 or 81 respectively for mixed paper or cardboard, or 12b, leading to 36, for waste destined only for pelletising for fuel. If the high-grade paper does not require shredding the conveyor would be shortened to allow the material to fall directly onto conveyor 2.

If the material originally loaded onto conveyor 7 were largely of another category, the conveyor end would be positioned so that unless removed manually it would all pass either onto conveyor 2 for baling in baler 1, or conveyor 36, for eventual pelletising, onto 79 or 81 for passage to baler 6, onto 79a if polythene or onto 81a if polystyrene. Conveyors 79 and 81, each of which will hold the equivalent of 2 or 3 bales of material, are sometimes stationary, acting as temporary reservoirs. Each will only be operated, and then separately, when the conveyor 4 and baler 6 are empty.

The materials deposited at A-2 are largely of clean dry cardboard and papers. These are loaded onto conveyor 4 and taken to baler 6 to be compressed into bales suitable for reuse. The bales are then transferred by conveyor 5 to the storage area D to await dispatch.

An operative at a picking station P-2 has the task of identifying and removing from the conveyor 4 material which is not suitable for the said reuse. Glass and metal contaminant will be placed in a bin (not shown) which from time to time will be placed in containers for dispatch. Vegetable matter will be placed in a separate bin which will be emptied on conveyor 47 or 48.

Any polythene film observed will be placed on the cross-conveyor 79a which runs to silo 80 where it is accumulated until there is a sufficient quantity to complete a bale and conveyor 2 and baler 1 are empty, when the sheeting is removed from the silo and placed on conveyor 2 and taken to baler 1 for compressing into a bale and removed by conveyor 3 to storage. Any expanded polystyrene will similarly be removed to conveyor 81a which carries it to shredder 82 which discharges into silo 83. From time to time the silo 83 is emptied into briquetting machine 84 which produces briquettes of polystyrene which are carried by conveyor 85 to the storage area D. Any high-grade paper observed on belt 4 or 12a or 7 during the processing of other grades is removed to silo 86 and this is from time to time emptied onto conveyor 2 for baling and removal to storage.

The waste material deposited at B-2 is likely to comprise mainly paper but it is generally so inseparably contaminated—for example with carbon paper and plastics—as to have little or no re-use potential in paper or board making. Nevertheless it has a significant calorific value and the bulk of the material is conveyed to shredder 65 for eventual treatment in the pelletising machine 30 as already described. The conveyor 31 is, however, kept under close scrutiny, and if a significant quantity of clean paper or board were noticed by an operative at picking station P-6 it is manually diverted to a bin and eventually transferred to conveyor 2. Equally, if a significant quantity of glass, and metals were observed, this would similarly be diverted to bins and transferred to containers for dispatch. Likewise any wood would be transferred to conveyor 42.

The shredded material produced by machine 65 is passed on a conveyor under magnet 66 which removes any ferrous contaminants and deposits them in bin 87 for dumping. The remaining material is conveyed to screen 67 which removes fines which are then transferred by conveyor 49 to conveyor 47.

The shredded waste is passed to the second shredder 68 and the finely shredded material is placed in silo 69. From the silo the material is passed to the pelletising machine 30 and the pellets formed therein are transferred to cooler 70 from which the cooled pellets are transferred to conveyor 32. From conveyor 32 the pellets can be taken directly to bins in the storage area or diverted to bagging machine 35.

Grossly contaminated paper waste is loaded on to conveyor 10 and mechanically sorted by screening machine 11 which as already explained effects a separation of the individual components by their bulk. The largest items, say of dimensions exceeding 0.5 m, are discharged to conveyor 91 and in turn, if not removed by the operative at picking station P-4, onto conveyor 36 for pelletising. The operative at station P-4 deals with specific items generally as does his colleague at station P-3.

Intermediate items, such as newspapers and magazines, discharge to belt 12, of which transverse reach 12a runs parallel to conveyor 79 and provides a picking station P-5 for the removal of glass/metal and vegetable matter to bins and the transfer of cleaner paper to conveyor 7 and eventual baling and of high-grade material to silo 86. Any paper or cardboard is transferred to conveyor 78 either manually or, if the bulk of the residual material is paper or cardboard, by operating switch 93 and diverting all to conveyor 78. Material not removed at station P-5 is transferred to reach 12b and is discharged onto cross-conveyor 36.

Items having dimensions of the order of 150–200 mm pass to conveyor 13 where, unless picked off by operative at station P-7, they pass into air-classifier or alternative ballistic separator 15 which discharges light-weigh matter onto conveyor 36. Heavier items are passed to crusher 16 where glass is broken into particles small enough to pass through screen 60 and enter silo 61, whilst cans are forwarded to silo 63 unless they are of ferrous metal when magnet 19 diverts them to silo 62. At separate times the metal silos are emptied into flattener 64, and again at separate times flattened cans and glass from silo 61 are passed through screeen or float 20 and removed to screen 33 and then to storage. Lightweight matter removed in the screen or float are transferred onto conveyor 47, and plastics bottles are separated by device 22 and deposited in a bin which is later removed to conveyor 31 or 7. Contraries removed by screen 33 and an operative at station P-8 are placed in bins. From time to time glass/metal bins, filled at various picking stations are taken to containers for despatch.

It is intended that wastes brought to the centre and deposited at C-1 are predominantly of wood—either green or seasoned—the latter being exemplified by demolition timbers and old furniture. The platform conveyors 40 and 41 allow for the respective categories of wood to be spread out for storage and examination.

Clean green or seasoned woods can be sold for paper or board manufacture, or for horticultural or other use. These woods are fed to conveyor 42 and shredded by chipper 43 into chips. The chips are taken by conveyor 45 to the storage area and loaded into containers or are diverted by means of a switch operated from the control station to bagging machine 46.

Contaminated green or seasoned woods can be sold for board manufacture. These woods are fed separately onto conveyor 42 and shredded separately by chipping machine 43. Wood which is contaminated by large ferrous matter, such as bolts which are likely to damage the chipper, is removed at picking station P-9 and the contravening section of wood sawn off and transferred to conveyor 31, the remaining sections being then returned to conveyor 42.

Any extraneous materials observed at picking station P-11 are manually removed to bins.

Clean or contaminated seasoned woods with moisture content below 15% can alternatively be chipped separately and dispatched as a fuel in bulk or in packaged form, or diverted by switch 94 to a second chipper 75. This discharges to silo 77 from which chips are periodically fed to the briquetting machine 50.

Depending on the material being shredded by chipper 43, the screen 44 can be operated to pass smaller or larger quantities. Moreover, switch 92 can be operated to divert screenings either to the silo 77 or to the sink float 76. Thus if demolition timber including window frames containing glass and dry putty are passed through the chipper, glass and putty particles may be sifted out by screen 44 and passed to screen or sink-float 76 which will pass wood particles to conveyor 47 but dump the glass and putty in a trash bin.

It is to be noted that the various types of timber are preferably fed to the shredder in batches so that there is substantial uniformity of material.

The waste material deposited at C-2 includs any wet organic matter, but is principally garden, fruit and vegetable waste together, perhaps, with thin woody tissue transferred from platform 40, and timber ash. The material is placed on conveyor 48 and picked over by an operative at an adjacent picking station P-10 for the removal to bins of any glass/metal or paper/cardboard and the transfer of any solid timber to conveyor 42. The remaining material is fed into shredder 55. Comminuted material produced by this machine and deposited at compost zone 56 is removed at intervals and stored in aerated heaps adjacent the centre for a period of about three weeks and then screened to remove trash. The composted material is then left to mature for about four months and again screened to separate finer from coarser composts which are separately bagged or dispatched in bulk. Uncomposted trash removed by screens 58 and 59 is fed to the conveyor 31 (if dry and organic) or removed to a land-fill site.

The embodiment described is capable of being extensively modified within the invention as claimed. For example, the grading or screening device 11 may be either a gravity vibratory machine or a rotating drum separator. More fundamentally, FIG. 2 shows a variation on the arrangement of FIG. 1 in relation to screening machine 44. It has been found in practice that the chipping machine 43 sometimes discharges over-sized chips, so screen 44 may be arranged to separate out such chips. As seen in FIG. 2 a conveyor 39a is provided to return oversize particles separated by screen 44 back to chipping machine 43 for re-treatment. Whilst normal-sized particles are conveyed as previously described, via conveyor 45 to bagging machine 46 or via switch 94 to chipper 75, fines are discharged into dry density separator 76 which deposits high-density matter to a trash bin, but which, when dry wood is being processed, discharges low density matter into chipper 75, or, when wet wood is being processed, is arranged to deposit the low-density material onto conveyor 47.

In a further modification, not shown, a small shredding machine is provided in the reach of the operative at picking station 4 into which wood and other organic matter found on conveyor 91 may be placed. The shredding machine is arranged to discharge onto an extension of conveyor 47 so that the shredded vegetable matter produced thereby shall be transported to compost zone 57.

Whilst the provision of a processing centre is a fundamental feature of the invention, it is recognised that it may be impracticable to conduct all separation in the centre, and the invention also encompasses a pre-sort operation, carried out at a land-fill site or waste-transfer station, preferably in the vicinity of the centre.

The purpose of the pre-sort operation is to recover reusable materials from bulky trade wastes which are deposited, on reception, into separate piles which, for example, may respectively comprise soil-rich, timber-rich and paper-rich lots. When a sufficient quantity of material has been assembled in any one of the piles, the material is loaded into a mobile pre-sort plant which combines separation by size with magnetic separation of metals, hand picking, and, when required, with ballistic separation by density.

Thus in the scheme shown in the Table below, all the wastes are first separated into size fractions: under 150 mm, between 150 and 400 mm, and over 400 mm. The small and medium sized timber and paper rich fractions are then separated into light and heavy fractions, and all categories are passed under an overband magnet for the removal of ferrous metals. If the fine fraction of the soil waste is seen to be excessively contaminated, it is advantageously transported to reception area C of the processing centre as previously described where it is likely to end up as compost; otherwise it may well find a market as clean soil. Each of the other fractions will be disposed of as indicated.

TABLE

| Waste Types | Size (and density) Fractions | | |
|---|---|---|---|
| | Under 150 mm | 150–400 mm | Over 400 mm |
| SOIL rich | SOIL (M/C) | compost (C) | Timber (C) |
| | Ferrous (M) | h-DUMP (L) | Ferrous (M) |
| | | Ferrous (M) | Dump (L) |
| TIMBER rich | l-FUEL (B) | l-FUEL (B) | Timber (C) |
| | h-DUMP (L) | h-DUMP (L) | Paper (A) |
| | Ferrous (M) | h-Comp/Tim (C) | Ferrous (M) |
| | | Ferrous (M) | Dump (L) |
| PAPER rich | l-FUEL (B) | FUEL (B) | PAPER (A) |
| | h-Dump (L) | Ferrous (M) | Co/Tim (C) |
| | Ferrous (M) | | Ferrous (M) |
| | | | Dump (L) | l = light;
h = heavy;
M = directly marketable;
L = to land-fill;
A, B, C = corresponding process centre reception areas

I claim:

1. A method for the reclamation of wastes comprising
   (a) assembling at a waste reclamation center dry secondary organic wastes that have been separated into
      generally uncontaminated waste,
      waste contaminated with lesser amounts of extraneous matter, and
      waste contaminated with greater amounts of extraneous matter,
   (b) transferring said generally uncontaminated waste in a first processing line to a packing zone within the center, and packaging same for primary reuse,
   (c) transferring said lesser contaminated waste in a second processing line to a pelletizing zone within the center and pelletizing the same for reuse as a fuel, and
   (d) in a third processing line separating from the waste contaminated with greater amounts of extraneous matter
      (1) components suitable for use in step (b), and
      (2) components suitable for use in step (c), and
   (e) transferring said components (1) and (2) to said first and second processing lines respectively.

2. Apparatus for waste reclamation comprising
   (a) packing means for dry secondary organic waste,
   (b) conveyor means for transferring dry secondary organic waste from a first collection zone to said packing means and from said packing means to a first dispatch zone,
   (c) means for pelletizing dry secondary organic waste into fuel pellets,
   (d) conveyor means for transferring lesser-contaminated waste from a second collection zone to said pelletizing means and from said pelletizing zone to a second dispatch zone,
   (e) means for separating components of greater-contaminated waste,
   (f) conveyor means for transferring greater-contaminated wastes from a third collection zone to said separating means, and
   (g) separate conveyor means for transferring separated components of said greater-contaminated wastes to said packing means and to said pelletizing means.

3. Apparatus according to claim 2 wherein the separating means include means for separating components by size, by density, by strength, or by magnetic flux.

4. Apparatus according to claim 2 further including means for conveying components to a composting zone.

5. A method for the reclamation of wastes at a waste reclamation center comprising
   (a) transferring primary organic waste from a first collection zone to a chipping means,
   (b) chipping the said waste and transferring the chipped waste from said chipping means to a first dispatch zone in a first processing line,
   (c) transferring primary organic waste from the first processing line to compressing means,
   (d) compressing the said primary waste into fuel briquettes,
   (e) transferring the briquettes to a second dispatch zone in a second processing line, and
   (f) transferring other organic wastes from a second collection zone to a compost zone and converting said other wastes into compost.

6. Apparatus in a waste reclamation center comprising
   (a) chipping means for primary organic waste,
   (b) first conveyor means for transferring the organic waste from a first collection zone to said chipping means and from said chipping means to a first dispatch zone,
   (c) means for compressing organic waste into fuel briquettes, and
   (d) second conveyor means for transferring primary organic waste from said first conveyor means to said compressing means and from said compressing means to a second dispatch zone.

7. Apparatus according to claim 6 which includes a third conveyor means for transferring other wastes from a second collection zone to a compost zone.

8. Apparatus according to claim 6 which includes means for transferring waste from the second conveying means to a compost zone.

9. Apparatus according to claim 6 which further includes means for transferring waste from a machine for separating waste by size or by density to a compost zone.

* * * * *